US 6,662,775 B2

(12) United States Patent
Hauser

(10) Patent No.: US 6,662,775 B2
(45) Date of Patent: Dec. 16, 2003

(54) INTEGRAL AIR COMPRESSOR FOR BOOST AIR IN BARREL ENGINE

(75) Inventor: Bret R. Hauser, Converse, TX (US)

(73) Assignee: Thomas Engine Company, LLC, Covington, LA (US)

(*) Notice: Subject to any disclaimer, the term of this patent is extended or adjusted under 35 U.S.C. 154(b) by 0 days.

(21) Appl. No.: 10/263,264

(22) Filed: Oct. 2, 2002

(65) Prior Publication Data
US 2003/0079715 A1 May 1, 2003

Related U.S. Application Data
(60) Provisional application No. 60/326,857, filed on Oct. 3, 2001.

(51) Int. Cl.⁷ .......................... F02B 53/00; F02B 75/18; F02B 75/06
(52) U.S. Cl. .................. 123/241; 123/43 AA; 123/56.8
(58) Field of Search ............................ 123/43 AA, 241, 123/243, 249, 44 E, 43 A, 56.9, 56.8, 56.1, 56.2, 56.3, 56.5, 56.6, 62, 61 R

(56) References Cited

U.S. PATENT DOCUMENTS

| 127,747 A | 6/1872 | Donnelly |
| 174,590 A | 3/1876 | Tesseyman |

(List continued on next page.)

FOREIGN PATENT DOCUMENTS

| DE | 3214516 | 10/1983 | ............ F02B/71/00 |
| DE | 3342108 | 8/1984 | ............ F02B/75/32 |
| DE | 3408447 A1 * | 9/1985 | ............ F02B/75/26 |
| DE | 4015867 | 11/1991 | ............ F02B/57/00 |
| EP | 0 093 822 | 11/1983 | ............ F02B/57/10 |
| EP | 0 136 565 | 4/1985 | ............ F02B/61/06 |
| FR | 20203 | 10/1899 | |
| FR | 416364 | 3/1910 | |
| FR | 433357 | 10/1911 | |
| FR | 624291 | 3/1926 | |
| FR | 711040 | 11/1931 | |
| FR | 2 557 659 | 7/1985 | ............ F16H/25/12 |
| FR | 2 566 460 | 12/1985 | ............ F02B/75/26 |
| FR | 2 707 700 | 1/1995 | ............ F02B/75/32 |
| GB | 113711 | 3/1918 | |
| GB | 377 877 | 8/1932 | |
| JP | 55-23308 | 2/1980 | ............ F01B/3/04 |
| JP | 580183825 | 10/1983 | ............ F02B/75/26 |
| WO | WO 92/09798 | 6/1992 | ............ F02B/75/04 |
| WO | WO 92/09799 | 6/1992 | ............ F02B/75/04 |
| WO | WO 98/07973 | 2/1998 | ............ F02M/7/00 |
| WO | WO 00/57044 | 9/2000 | ............ F02B/57/08 |

OTHER PUBLICATIONS

US 6,019,073, 2/2000, Sanderson (withdrawn)

(List continued on next page.)

Primary Examiner—Sheldon J. Richter
(74) Attorney, Agent, or Firm—Gifford, Krass, Groh, Sprinkle, Anderson & Citkowski, P.C.

(57) ABSTRACT

In a double-ended barrel engine, a compression cylinder and a combustion cylinder share a common axis, with a combustion piston and a compression piston being interconnected by a connecting rod. The compression end of the engine includes a valve plate assembly with a generally flat valve plate with intake and exhaust passages defined therethrough. An intake flapper valve is disposed on the inner surface of the valve plate and selectively covers the intake passage. An exhaust flapper valve is disposed on the outer surface of the valve plate and selectively covers the exhaust passage. Additional cylinders and pistons may be provided. A compression plenum may be provided in fluid communication with the exhaust passages from one or more compression cylinders, and be in fluid communication with the intake system for the combustion end of the engine. A wastegate may be provided for venting the compression plenum.

17 Claims, 1 Drawing Sheet

U.S. PATENT DOCUMENTS

| | | |
|---|---|---|
| 227,319 A | 5/1880 | Tegnander |
| 344,593 A | 6/1886 | Peabody |
| 349,775 A | 9/1886 | Wood |
| 367,029 A | 7/1887 | Esty |
| 571,129 A | 11/1896 | Schumacher |
| 574,762 A | 1/1897 | Rowbotham |
| 593,248 A | 11/1897 | Smith |
| 600,971 A | 3/1898 | Singer |
| 657,409 A | 9/1900 | Gould |
| 669,234 A | 3/1901 | Fuhrmann et al. |
| 697,649 A | 4/1902 | McLean |
| 706,320 A | 8/1902 | Jenney |
| 706,494 A | 8/1902 | Minogue |
| 749,864 A | 1/1904 | James |
| 766,410 A | 8/1904 | Alger |
| 771,037 A | 9/1904 | Beck |
| 782,597 A | 2/1905 | Cheshire |
| 815,911 A | 3/1906 | Eddy |
| 818,609 A | 4/1906 | Butikofer |
| 839,300 A | 12/1906 | Krohn |
| 848,665 A | 4/1907 | Lombard |
| 850,295 A | 4/1907 | Chappell |
| 851,293 A | 4/1907 | Lehberger |
| 868,497 A | 10/1907 | Smith |
| 893,038 A | 7/1908 | Vadam |
| 893,181 A | 7/1908 | Macomber |
| 896,448 A | 8/1908 | Herndon |
| 897,963 A | 9/1908 | Clayton et al. |
| 928,715 A | 7/1909 | Thurber |
| 933,316 A | 9/1909 | Macomber |
| 945,232 A | 1/1910 | Harding |
| 947,008 A | 1/1910 | Williams et al. |
| 968,969 A | 8/1910 | Ord |
| 972,966 A | 10/1910 | Williams |
| 980,491 A | 1/1911 | Coleman |
| 998,363 A | 7/1911 | De Lukacsevics |
| 999,047 A | 7/1911 | Lehberger |
| 1,033,701 A | 7/1912 | Iochum |
| 1,038,537 A | 9/1912 | Dexter |
| 1,042,018 A | 10/1912 | Macomber |
| 1,050,456 A | 1/1913 | Helin |
| 1,053,799 A | 2/1913 | Eslick |
| 1,063,456 A | 6/1913 | Looney |
| 1,065,604 A | 6/1913 | Gray |
| 1,076,179 A | 10/1913 | Whitehead |
| 1,076,807 A | 10/1913 | Anderson |
| 1,080,123 A | 12/1913 | Pratt |
| 1,087,861 A | 2/1914 | Alexander et al. |
| 1,097,150 A | 5/1914 | Vallez |
| 1,104,539 A | 7/1914 | Ord |
| 1,132,161 A | 3/1915 | Cassady et al. |
| 1,132,581 A | 3/1915 | Hein |
| 1,136,363 A | 4/1915 | Pepper |
| 1,142,367 A | 6/1915 | Reiche |
| 1,147,313 A | 7/1915 | Desort |
| 1,170,918 A | 2/1916 | Lundy |
| 1,177,126 A | 3/1916 | Miller |
| 1,177,609 A | 4/1916 | Edwards |
| 1,181,463 A | 5/1916 | La Fontaine |
| 1,183,470 A | 5/1916 | Lee |
| 1,183,777 A | 5/1916 | Soules |
| 1,189,477 A | 7/1916 | Peytoureau |
| 1,202,598 A | 10/1916 | Simpson |
| 1,204,892 A | 11/1916 | Macomber |
| 1,206,800 A | 12/1916 | Batt |
| 1,207,846 A | 12/1916 | Bradford |
| 1,209,995 A | 12/1916 | Ord |
| 1,215,434 A | 2/1917 | Trebert |
| 1,219,377 A | 3/1917 | Davidson |
| 1,222,475 A | 4/1917 | Sears |
| 1,226,789 A | 5/1917 | Macomber |
| 1,228,101 A | 5/1917 | Dutton |
| 1,229,009 A | 6/1917 | Allison |
| 1,250,709 A | 12/1917 | Tanner |
| 1,252,436 A | 1/1918 | Hickey |
| 1,255,664 A | 2/1918 | Syger |
| 1,256,382 A | 2/1918 | Scott |
| 1,261,111 A | 4/1918 | Fasey et al. |
| 1,275,494 A | 8/1918 | Storle |
| 1,276,346 A | 8/1918 | Gould |
| 1,277,964 A | 9/1918 | Lovelace |
| 1,282,179 A | 10/1918 | Brackett |
| 1,282,180 A | 10/1918 | Brackett |
| 1,283,575 A | 11/1918 | Shepard |
| 1,289,424 A | 12/1918 | Faupel |
| 1,291,531 A | 1/1919 | James et al. |
| 1,293,733 A | 2/1919 | Duby |
| 1,298,191 A | 3/1919 | Fasey |
| 1,307,045 A | 6/1919 | Galbreath |
| 1,312,234 A | 8/1919 | Carlson |
| 1,313,569 A | 8/1919 | Wilks et al. |
| 1,316,679 A | 9/1919 | Brackett |
| 1,321,045 A | 11/1919 | Hutchinson |
| 1,321,046 A | 11/1919 | Hutchinson |
| 1,324,520 A | 12/1919 | Robbins |
| 1,324,534 A | 12/1919 | Ambrose |
| 1,328,261 A | 1/1920 | Blankenburg |
| 1,332,756 A | 3/1920 | Root |
| 1,332,948 A | 3/1920 | Murphy |
| 1,338,039 A | 4/1920 | Porter |
| 1,338,185 A | 4/1920 | Looney |
| 1,339,276 A | 5/1920 | Murphy |
| 1,345,808 A | 7/1920 | Reynolds |
| 1,345,940 A | 7/1920 | Looney |
| 1,347,762 A | 7/1920 | Shepard |
| 1,348,371 A | 8/1920 | Murphy |
| 1,364,256 A | 1/1921 | Des Engants et al. |
| 1,366,636 A | 1/1921 | Conway |
| 1,370,856 A | 3/1921 | Thomson |
| 1,374,315 A | 4/1921 | Murphy |
| 1,374,915 A | 4/1921 | Fasey |
| 1,375,140 A | 4/1921 | Fasey |
| 1,377,383 A | 5/1921 | Bair |
| 1,377,899 A | 5/1921 | De Lukacsevics et al. |
| 1,379,774 A | 5/1921 | Murphy |
| 1,379,775 A | 5/1921 | Murphy |
| 1,382,485 A | 6/1921 | Lukacsevics |
| 1,384,344 A | 7/1921 | Powell |
| 1,389,873 A | 9/1921 | Hult |
| 1,389,967 A | 9/1921 | Murphy |
| 1,390,034 A | 9/1921 | Howard |
| 1,393,174 A | 10/1921 | Shepard |
| 1,405,224 A | 1/1922 | Kenmonth |
| 1,407,293 A | 2/1922 | Mott |
| 1,408,385 A | 2/1922 | Newton |
| 1,413,363 A | 4/1922 | Smith et al. |
| 1,427,632 A | 8/1922 | Pryor |
| 1,445,686 A | 2/1923 | Hult |
| 1,466,144 A | 8/1923 | Murphy |
| 1,466,276 A | 8/1923 | Egersdorfer |
| 1,476,307 A | 12/1923 | Toth |
| 1,487,338 A | 3/1924 | Kelley |
| 1,492,215 A | 4/1924 | Nedoma |
| 1,503,741 A | 8/1924 | Almen |
| 1,508,623 A | 9/1924 | Somervell |
| 1,529,687 A | 3/1925 | Bowen |
| 1,544,382 A | 6/1925 | Entler |
| 1,545,925 A | 7/1925 | Powell |
| 1,549,556 A | 8/1925 | Kennedy |
| 1,556,300 A | 10/1925 | Olsen |
| 1,565,184 A | 12/1925 | Miller |

| | | | | | | |
|---|---|---|---|---|---|---|
| 1,568,378 A | 1/1926 | Gribojedoff | | 2,567,576 A | 9/1951 | Palumbo .................... 74/56 |
| 1,569,525 A | 1/1926 | Owens | | 2,622,567 A | 12/1952 | Myard .................... 121/101 |
| 1,604,474 A | 10/1926 | Nisbet | | 2,647,363 A | 8/1953 | Stott ........................ 60/13 |
| 1,610,060 A | 12/1926 | Lind | | 2,650,676 A | 9/1953 | Jamotte .................... 184/6 |
| 1,614,476 A | 1/1927 | Hutchinson | | 2,664,866 A | 1/1954 | Fulke |
| 1,622,986 A | 3/1927 | Weingartner | | 2,767,589 A | 10/1956 | Redrup et al. ............... 74/57 |
| 1,625,841 A | 4/1927 | Wright | | 2,770,140 A | 11/1956 | Palumbo .................... 74/56 |
| 1,628,100 A | 5/1927 | Bacon | | 2,770,224 A | 11/1956 | Ericson .................... 123/48 |
| 1,629,686 A | 5/1927 | Dreisbach | | 2,770,225 A | 11/1956 | Palumbo .................. 123/58 |
| 1,655,738 A | 1/1928 | Rasck | | 2,776,649 A | 1/1957 | Fenske .................... 123/58 |
| 1,661,582 A | 3/1928 | Szydlowski | | 2,781,749 A | 2/1957 | Stucke .................... 123/51 |
| 1,664,086 A | 3/1928 | Olsen | | 2,783,751 A | 3/1957 | Karlan .................... 123/58 |
| 1,673,632 A | 6/1928 | Mattson | | 2,856,781 A | 10/1958 | Forbes ...................... 74/56 |
| 1,675,629 A | 7/1928 | Andrews | | 2,875,701 A | 3/1959 | Ebert .................... 103/162 |
| 1,693,024 A | 11/1928 | Drummond | | 2,949,100 A | 8/1960 | Peterson .................. 123/43 |
| 1,696,676 A | 12/1928 | Fuhr | | 2,962,008 A | 11/1960 | Hopkins .................. 123/45 |
| RE17,273 E | 4/1929 | Michell | | 2,966,899 A | 1/1961 | Herrmann ................. 123/58 |
| 1,707,779 A | 4/1929 | Atkeson | | 2,994,188 A | 8/1961 | Howard .................... 60/13 |
| 1,716,621 A | 6/1929 | Cizek | | 3,039,676 A | 6/1962 | Mikina .................. 230/173 |
| 1,717,999 A | 6/1929 | Olsen | | 3,040,721 A | 6/1962 | Schotthoefer ............... 123/47 |
| 1,736,507 A | 11/1929 | Peterson | | 3,068,709 A | 12/1962 | Peterson .................... 74/57 |
| 1,738,512 A | 12/1929 | Andrews | | 3,078,832 A | 2/1963 | Braine ................ 123/41.65 |
| 1,745,821 A | 2/1930 | Gribojedoff | | 3,107,541 A | 10/1963 | Parsus ...................... 74/57 |
| 1,757,778 A | 5/1930 | Mehlum | | 3,126,835 A | 3/1964 | Kline .................... 103/162 |
| 1,762,650 A | 6/1930 | Boughton | | 3,169,514 A | 2/1965 | Girodin .................. 123/58 |
| 1,770,311 A | 7/1930 | Keith | | 3,170,444 A | 2/1965 | Haddon ................ 123/41.34 |
| 1,772,531 A | 8/1930 | Williams | | 3,182,644 A | 5/1965 | Drtina .................... 123/58 |
| 1,772,977 A | 8/1930 | Arrighi | | 3,202,141 A | 8/1965 | Lovell ...................... 123/1 |
| 1,774,713 A | 9/1930 | Jahn et al. | | 3,306,269 A | 2/1967 | Dimmock, Jr. ............. 123/15 |
| 1,779,032 A | 10/1930 | Cathcart | | 3,326,193 A | 6/1967 | Wahlmark ................. 123/43 |
| 1,788,140 A | 1/1931 | Woolson | | 3,333,577 A | 8/1967 | Mongitore ................. 123/18 |
| 1,788,259 A | 1/1931 | Ward et al. | | 3,359,864 A | 12/1967 | Hamlin .................... 91/175 |
| 1,793,107 A | 2/1931 | Livingston | | 3,385,051 A | 5/1968 | Kelly ........................ 60/24 |
| 1,796,453 A | 3/1931 | Goehler | | 3,396,709 A | 8/1968 | Robicheaux ............... 123/45 |
| 1,798,866 A | 3/1931 | Bleser | | 3,403,668 A | 10/1968 | Schottler ................. 123/197 |
| 1,799,772 A | 4/1931 | Wormley | | 3,407,593 A | 10/1968 | Kelly ........................ 60/24 |
| 1,804,598 A | 5/1931 | Earl | | 3,408,898 A | 11/1968 | Hamlin |
| 1,807,087 A | 5/1931 | Finke | | 3,456,630 A | 7/1969 | Karlan .................... 123/58 |
| 1,808,083 A | 6/1931 | Tibbetts | | 3,570,463 A | 3/1971 | Nelson .................... 123/122 |
| 1,810,017 A | 6/1931 | Houston | | 3,587,538 A | 6/1971 | Poole ...................... 123/45 |
| 1,813,259 A | 7/1931 | Schick | | 3,598,094 A | 8/1971 | Odawara ................. 123/58 |
| 1,828,353 A | 10/1931 | Bleser | | 3,626,911 A | 12/1971 | Shaw ...................... 123/45 |
| 1,838,974 A | 12/1931 | Williams | | 3,654,906 A | 4/1972 | Airas ...................... 123/45 |
| 1,839,592 A | 1/1932 | Reynolds | | 3,673,991 A | 7/1972 | Winn ...................... 123/58 |
| 1,846,961 A | 2/1932 | Greening et al. | | 3,687,117 A | 8/1972 | Panariti .................. 123/43 |
| 1,851,416 A | 3/1932 | Bauer | | 3,695,237 A | 10/1972 | Londo .................... 123/43 |
| 1,857,000 A | 5/1932 | Kleschka | | 3,745,887 A | 7/1973 | Striegl .................... 92/146 |
| 1,864,248 A | 6/1932 | Holmes | | 3,745,981 A | 7/1973 | Warner .................... 123/58 |
| 1,866,398 A | 7/1932 | Craig | | 3,786,790 A | 1/1974 | Plevyak .................. 123/58 |
| 1,867,504 A | 7/1932 | Franklin | | 3,805,749 A | 4/1974 | Karlan .................... 123/58 |
| 1,871,973 A | 8/1932 | Finke | | 3,807,370 A | 4/1974 | Baugh ...................... 123/43 |
| 1,876,506 A | 9/1932 | Lee | | 3,828,741 A | 8/1974 | Bixier .................... 123/58 |
| 1,878,767 A | 9/1932 | Freund | | 3,830,208 A | 8/1974 | Turner .................... 123/43 |
| 1,880,224 A | 10/1932 | Wilsey | | 3,844,258 A | 10/1974 | Howell .................... 123/43 |
| 1,885,492 A | 11/1932 | Trew | | 3,854,284 A | 12/1974 | Denker .................. 60/39.61 |
| 2,368,444 A | 1/1945 | Blanding | | 3,895,614 A | 7/1975 | Bailey .................... 123/67 |
| 2,369,002 A | 2/1945 | Allison | | 3,899,880 A | 8/1975 | Rohs .................... 60/39.61 |
| 2,382,280 A | 8/1945 | Allison | | 3,902,466 A | 9/1975 | Gulko .................... 123/43 |
| 2,384,292 A | 9/1945 | Feroy | | 3,902,468 A | 9/1975 | Turner .................... 123/43 |
| 2,399,743 A | 5/1946 | Kahl | | 3,905,338 A | 9/1975 | Turner .................... 123/43 |
| 2,401,466 A | 6/1946 | Davis et al. | | 3,913,534 A | 10/1975 | Bratten .................. 123/8.49 |
| 2,406,292 A | 8/1946 | Hall | | 3,923,018 A | 12/1975 | Markowitz ............... 123/43 |
| 2,409,868 A | 10/1946 | Kahl | | 3,929,107 A | 12/1975 | Renger .................... 123/32 |
| 2,417,487 A | 3/1947 | Hall | | 3,939,809 A | 2/1976 | Rohs .................... 123/58 |
| 2,439,265 A | 4/1948 | Schroeder | | 3,943,895 A | 3/1976 | Howell .................... 123/58 |
| 2,444,764 A | 7/1948 | Baker | | 3,945,359 A | 3/1976 | Asaga .................... 123/58 |
| 2,447,314 A | 8/1948 | Carroll | | 3,968,776 A | 7/1976 | Rund ...................... 123/43 |
| 2,456,164 A | 12/1948 | Youhouse | | 3,970,055 A | 7/1976 | Long ...................... 123/43 |
| 2,477,542 A | 7/1949 | Lane .................... 74/57 | | 3,973,531 A | 8/1976 | Turner .................... 123/43 |
| 2,512,265 A | 6/1950 | Brigaudet ............... 123/43 | | 4,022,167 A | 5/1977 | Kristiansen ............... 123/43 |
| 2,556,585 A | 6/1951 | Jarvinen ................ 123/43 | | 4,022,168 A | 5/1977 | Sprague .................. 123/43 |

| | | | |
|---|---|---|---|
| 4,023,542 A | 5/1977 | Ango | 123/58 |
| 4,060,060 A | 11/1977 | Turner | 123/43 |
| 4,084,555 A | 4/1978 | Outlaw | 123/58 |
| 4,127,096 A | 11/1978 | Townsend | 123/41.56 |
| 4,129,101 A | 12/1978 | Townsend | 123/41.56 |
| 4,138,930 A | 2/1979 | Searle | 92/70 |
| 4,149,498 A | 4/1979 | Ferrell | 123/58 |
| 4,157,079 A | 6/1979 | Kristiansen | 123/43 |
| 4,185,508 A | 1/1980 | Hardt | 74/53 |
| 4,195,600 A | 4/1980 | Shingai | 123/73 |
| 4,213,427 A | 7/1980 | Di Stefano | 123/43 |
| 4,219,001 A | 8/1980 | Kumagai et al. | 123/169 |
| 4,250,843 A | 2/1981 | Chang | 123/43 |
| RE30,565 E | 4/1981 | Kristiansen | |
| 4,287,858 A | 9/1981 | Anzalone | 123/43 |
| 4,363,294 A | 12/1982 | Searle | 123/43 |
| 4,366,784 A | 1/1983 | Paul | 123/45 |
| 4,418,656 A | 12/1983 | Stanton | 123/58 |
| 4,453,508 A | 6/1984 | Groeger | 123/193 |
| 4,492,188 A | 1/1985 | Palmer et al. | 123/58 |
| 4,502,427 A | 3/1985 | Brille | 123/90.41 |
| 4,510,894 A | 4/1985 | Williams | 123/48 |
| 4,520,765 A | 6/1985 | Gerace | 123/27 |
| 4,553,508 A | 11/1985 | Stinebaugh | 123/58 |
| 4,565,165 A | 1/1986 | Papanicolaou | 123/51 |
| 4,571,946 A | 2/1986 | Demopoulos | 60/618 |
| 4,592,309 A | 6/1986 | Williams | 123/39 |
| 4,610,223 A | 9/1986 | Karian | 123/58 |
| 4,632,081 A | 12/1986 | Giuliani et al. | 123/198 |
| 4,635,590 A | 1/1987 | Gerace | 123/27 |
| 4,648,358 A | 3/1987 | Sullivan et al. | 123/43 |
| 4,768,481 A | 9/1988 | Wood | 123/254 |
| 4,834,033 A | 5/1989 | Larsen | 123/58 |
| 4,867,107 A | 9/1989 | Sullivan et al. | 123/43 |
| 4,867,121 A | 9/1989 | Bivona et al. | 123/197 |
| 4,915,064 A | 4/1990 | Mannerstedt, deceased et al. | 123/58 |
| 4,960,082 A | 10/1990 | Sullivan et al. | 123/43 |
| 4,974,555 A | 12/1990 | Hoogenboom | 123/56 |
| 4,974,556 A | 12/1990 | Royse | 123/58 |
| 4,996,953 A | 3/1991 | Buck | 123/58 |
| 5,009,198 A | 4/1991 | Sullivan et al. | 123/43 |
| 5,014,653 A | 5/1991 | Sullivan et al. | 123/43 |
| 5,016,580 A | 5/1991 | Gassman | 123/58 |
| 5,029,558 A | 7/1991 | Sullivan | 123/43 |
| 5,070,825 A | 12/1991 | Morgan | 123/43 |
| 5,083,532 A | 1/1992 | Wiesen | 123/58 |
| 5,103,778 A * | 4/1992 | Usich, Jr. | 123/43 AA |
| 5,140,953 A | 8/1992 | Fogelberg | 123/58 |
| 5,159,902 A | 11/1992 | Grimm | 123/43 |
| 5,209,190 A | 5/1993 | Paul | 123/43 |
| 5,218,933 A | 6/1993 | Ehrlich | 123/56 |
| 5,228,415 A | 7/1993 | Williams | 123/51 |
| 5,322,042 A | 6/1994 | di Priolo et al. | 123/263 |
| 5,323,738 A | 6/1994 | Morse | 123/43 |
| 5,329,893 A | 7/1994 | Drangel et al. | 123/78 |
| 5,351,657 A | 10/1994 | Buck | 123/43 |
| 5,375,567 A | 12/1994 | Lowi, Jr. | 123/56.8 |
| 5,437,251 A | 8/1995 | Anglim et al. | 123/56.3 |
| 5,443,043 A | 8/1995 | Nilsson et al. | 123/48 |
| 5,452,689 A | 9/1995 | Karlan | 123/56.2 |
| 5,456,220 A | 10/1995 | Candler | 123/43 |
| 5,467,757 A | 11/1995 | Yanagihara et al. | 123/305 |
| 5,476,072 A | 12/1995 | Guy | 123/48 |
| 5,507,253 A | 4/1996 | Lowi, Jr. | 123/56.9 |
| 5,517,953 A | 5/1996 | Wiesen | 123/51 |
| 5,535,716 A | 7/1996 | Sato et al. | 123/279 |
| 5,551,383 A | 9/1996 | Novotny | 123/51 |
| 5,566,578 A | 10/1996 | Rose | 74/57 |
| 5,636,561 A | 6/1997 | Pecorari | 91/499 |
| 5,647,308 A | 7/1997 | Biagini | 123/56.2 |
| 5,704,332 A | 1/1998 | Motakef | 123/225 |
| 5,743,220 A | 4/1998 | Guarner-Lans | 123/56.9 |
| 5,749,337 A * | 5/1998 | Palatov | 123/62 |
| 5,762,039 A | 6/1998 | Gonzalez | 123/197.3 |
| 5,765,512 A | 6/1998 | Fraser | 123/54.1 |
| 5,799,629 A | 9/1998 | Lowi, Jr. | 123/56.8 |
| 5,813,372 A | 9/1998 | Manthey | 123/43 |
| 5,832,880 A | 11/1998 | Dickey | 123/25 |
| 5,875,743 A | 3/1999 | Dickey | 123/25 |
| 5,890,462 A | 4/1999 | Bassett | 123/56.2 |
| 5,894,820 A | 4/1999 | Baeta | 123/56.1 |
| 5,904,044 A | 5/1999 | White | 60/443 |
| 5,950,580 A | 9/1999 | Birckbichler | 123/56.2 |
| 5,992,357 A | 11/1999 | Tasi | 123/56.2 |
| 6,003,480 A | 12/1999 | Quayle et al. | 123/56.1 |
| 6,089,195 A | 7/2000 | Lowi, Jr. | 123/53.6 |
| 6,092,512 A | 7/2000 | Ma | 123/568.15 |
| 6,145,429 A | 11/2000 | Paul | |
| 6,260,520 B1 | 7/2001 | Van Reatherford | 123/48 |
| 6,435,145 B1 * | 8/2002 | Said | 123/56.1 |

OTHER PUBLICATIONS

Stanglmaier R., Ryan T. and Souder J., "HCCI Operation of a Dual–Fuel Natural Gas Engine for Improved Fuel Efficiency and Ultra–Low NOx Emissions at Low to Moderate Engine Loads", 2001, SAE Paper 2001–01–1897.

"Engine Smoothness", 2000, www.fortunecity.com/silverstone/lancia/58/technical_school/engine/smoot.

"Reciprotating Combustion Engine", 2001, http://reciprotating.com/default.htm.

"Homogeneous–Charge Compression Ignition Stratified Charge Compression Ignition Engine Laboratory", 2000, http://www.ca.sandia.gov.

"SVD—A Unique Engine Concept", Feb. 2000, http://www.saab.com/home/GLOBAL/en/pressreleases.xml.

"Dynamics of the Swash Plate Mechanism" 1984, Proceedings of the 19845 Inter Compressor Engineering Conference.

"New Engine Excites Many in Auto Industry", 1998, http://www.detnews.com/1998/autos/9805/20/052001.htm.

Kawabata, Y., Nakagawa K. and Shoji. F., "Operating Characteristics of Natural Gas Fueled Homogeneous Charge Compression Ignition", 1998, Annual Technical Report Digest.

"Dyna–Cam Revolutionary Engine Design", 2001, http://www.dynacam.com.

Christensen, M., Johansson, B., and Einewall, P., "Homogeneous Charge Compression Ignition (HCCI) using isooctane, ethanol, and Natural Gas. A Comparison with Spark–Ignition Operation", 1997, SAE Paper 972874.

Hultqvist, A., Christensen, M., and Johansson, P., "A Study of the Homogeneous Charge Compression Ignition Combustion Process by Chemiluminescence Imaging", 1999, SAE Paper 1999–01–3680.

Gray A. and Ryan T., "Homogeneous Charge Compression Ignition (HCCI) of Diesel Fuel", 1997, SAE Paper 971676.

Ziph B. and Meijer R., "Variable Stroke Power Control for Stirling Engines", 1981, SAE Paper 810088.

Clucas D.M. and Raine J.K., "A New Wobble Drive with Particular Application in a Stirling Engine", 1994, IMechE. vol. 208.

Kontarakis G., Collings N. and Ma T., "Demonstration of HCCI Using Single–Cylinder, Four–stroke SI Engine with Modified Valve Timing", 2000 SAE 2000–01–2870.

Pucher, G., Gardener D., Bardon M. and Battista, V., "Alternative Combustion Systems for Piston Engines Involving Homogeneous Charge Compression Ignition Concepts—A Review of Studies Using Methanol, Gasoline, and Diesel Fuel", 1996, http://www.bcresearch.com.

Gill G.S. and Freudenstein F., "Minimization of Inertia–Induced Forces in Spherical Four–bar Mechanisms. Part 2: Wobble–Plate Engines", 1983, ASME.

Gill, G.S. and Freudenstein F., "Minimization of Inertis–Induced Forces in Spherical Four–bar Mechanisms. Part I: The General Spherical Four–bar Linkage", 1983, ASME vol. 105/471.

Hardenberg H. and Buhl H., "The Mercedes–Benz Om 403 VA—A Standard Production, Compression–Ignition, Direct– Injection Multifuel Engine", 1982, SAE Paper 820028.

Hiroshi T. and Masaharu H., "Historical Review of the Wobbleplate and Scroll Type Compressors", 1990, SAE Paper 901737.

Li J., Chae J., Lee S. and Jeong J., "Modeling the Effects of Split Injection Scheme on Soot and NOx Emissions of Direct Injection Diesel Engines by a Phenomenological Combustion Model", 1996, SAE Paper 962062.

McLanahan J., "Barrel Aircraft Engines: Historical Anomaly or Stymied Innovation", 1998, SAE Paper 985597.

Olsson J., Erlandsson O. and Johansson B. "Experiments and Simulation of a Six–Cylinder Homogeneous Charge Compression Ignition (HCCI) Engine", 2000, SAE Paper 2000–01–2867.

"Erickson MCC FE–120", 1001, www.ericksonmotors.com/fe–120.htm.

Miyagawa K. and Kayukawa H., "Development of the Swash Plate–Type Continuously Variable Displacement Compressor", 1998, SAE Paper 980290.

Sadashivappa K., Singaperumal M. and Narayanasamy K., "On the Efficiency of the Axial Piston Motor Considering Piston Form Deviations", 1995, Pergamon 0957–4158 (95) 00074–7.

Edge K.A. and Darling j., "The Pumping Dynamics of Swash Plate Piston Pumps", 1989, ASME vol. 111/307.

Thieme L. and Allen D., "Testing of a Variable–Stroke Stirling Engine", 1986, 21st Intersociety Energy Conversion Engineering Conference, Paper 869104.

Thieme L., "Initial Testing of a Variable STroke Stirling Engine", 1985, U.S. Dept. of Energy, NASA TM–86875.

Au M., Girard J. and Hiltner J., "Homogeneous Charge Compression Ignition", 2001 http://www.me.berkeley.edu/–mctai/hcci.html.

Christensen M., Hultqvist A. and Johansson B., "Demonstrating the Multi–Fuel Capability of a Homogeneous Charge Compression Ignition with Variable Compression Ratio", 1999, SAE Paper 1999–01–3679.

Christensen M. and Johansson B., "Influence of Mixture Quality on Homogeneous Charge Compression Ignition", 1998, SAE Paper 982454.

Christensen M., Johansson B., Amneus P., and Mauss F., "Supercharged Homogeneous Charge Compression Ignition (HCCI)", 1998, SAE Paper 980787.

Kraft M., Maigaard P. and Mauss F., "Homogeneous Charge Compression Ignition Engine: A Simulation Study on the Effects of Inhomogeneities", 2000, ASME 2000 Spring Technical Conference.

Kraft M., Maigaard P., Mauss F. and Christensen M., "Investigations of Combustion Emissions in a HCCI Engine Measurements and a New Computational Model 2000 28th International Symposium for Combustion", 4E12.

Maricq M., Munoz R., Yang J. and Anderson R., "Sooting Tendencies in an Air Forced Direct Injection Spark–Ignition (DISI) Engine", 2001, SAE Paper 2001–01–0255.

Manring N., "Slipper Tipping within an Axial–Piston Swash–Plate Type Hydrostatic Pump", 1998, ASME FPST–vol. 5.

Jinqu N., Fukai I. and Kurihara M., "The Development of a Fixed–displacement Single–sided Swash Plate a/c Compressor", 2001, SAE Paper 2001–01–0971.

Kaahaaina N., Siman A., Caton P. and Edwards C., "Use of Dynamic Valving to Achieve Residual–Affected Combustion", 2000, SAE Paper 2001–01–0549.

Stanglmaier R. and Robert C., "Homogeneous Charge Compression Ignition (HCCI): Benefits, Compromises, and Future Engine Applications", 1999, SAE Paper 19999–01–3682.

Thring R., "Homogeneous Charge Compression Ignition (HCCI) Engines", 1989, SAE Paper 892068.

Fiveland S., and Assanis D., "A Four–Stroke Homogeneous Charge Compression Ignition Engine Stimulation for Combustion and Performance Studies", 2000, SAE Paper 2000–01–0332.

Nishimura T., Umeda T., Tsuta T. and Fujiwara, M., "Dynamic Response Analysis of a Swash Plate Type Hydraulic Piston Pump", 1995, ASME/JSME Pressure Vessels and Piping Conference PVP–vol. 300.

Sheiretov T., Glabbek W. and Cusano C., Simulative Friction and Wear Study of Retrofitted Swash Plate and Rolling Piston Compressors, 1995.

Taya T., Kobayashi H., Kawaguchi M. and Inagaki M., "10PC20 Swash Plate Type Variable Displacement Compressor for Automobile Air Conditioners", 1992, SAE Paper 920260.

Ryan T. and Callahan T. "Homogeneous Charge Compression Ignition of Diesel Fuel", 1996, SAE Paper 961160.

Tsuta T., Iwamoto T. and Umeda T. "Combined Dynamic Response Analysis of a Piston–Slipper System and Libricants in Hydraulic Piston Pump", 1999, ASME PVP vol. 396.

Zhang X., Cho J., Nair S., Manring N., "Damping on the Swash Plate of an Axial–Piston Pump 2000", 2000, American Control Conference.

"New Saab and Citroen Technology at Geneva", Automotive Engineering Online, SAE International, May 2000.

Herling, D., Smith, M., Baskaran, S., and Kupe J., "Application of Non–Thermal Plasma Assisted Catalyst Technology for Diesel Emission Reduction", 2000, SAE Paper 2000–01–3088.

Law, D., Kemp, D., Allen, J., Kirkpatrick, G., and Copland, T., "Controlled Combustion in an IC–Engine with a Fully Variable Valve Train", 2001, SAE Paper 2000–01–0251.

"Advanced Engine Technologies' OX2 Engine Poised as Alternative for Future World Energy Needs", Press Release, Thursday, Feb. 8, 4:34 p.m. Eastern Time (http://biz.yahoo.com/prnews/010208/ca_advance_4.html).

"Advanced Engine Technologies Unveils New Web Site", Press Release, Monday, Mar. 12, 12:00 p.m. Eastern Time (http://biz.yahoo.com/prnews/010312/lam013_2.html).

* cited by examiner

US 6,662,775 B2

INTEGRAL AIR COMPRESSOR FOR BOOST AIR IN BARREL ENGINE

REFERENCE TO RELATED APPLICATION

This application claims priority from U.S. Provisional Patent Application Ser. No. 60/326,857, filed Oct. 3, 2001, the entire contents of which is incorporated herein by reference.

FIELD OF THE INVENTION

The present invention relates generally to internal combustion engines and, more specifically, to an internal combustion barrel-style engine with an integral air compressor.

BACKGROUND OF THE INVENTION

Barrel engine configurations have conventionally held the potential for high power density packages. This is desirable in many applications, particularly those requiring mobile power sources such as automotive and truck markets as well as aerial vehicles. Barrel engines typically involve a grouping of power cylinders and pistons that are oriented such that their axes are parallel to each other as well as the power output shaft. Power is transmitted from the reciprocating pistons to a cam plate via a roller interface. The cam plate's nominal plane is perpendicular to the piston axes and attached to the output shaft. One variation, commonly referred to as a double-ended barrel engine, typically uses a double-ended piston construction and utilizes pistons that have power cylinders at each end. Another configuration of the barrel engine concept, commonly known as a single-ended barrel engine, only uses power cylinders on one end of the piston and is commonly known as a single-ended piston construction.

In either case, a significant challenge is the ability to react side loads on the pistons caused by the pressure angle of the cam surface. This side load must be reacted on both sides of the cam and piston interface and may involve use of crosshead devices or the piston skirt(s) directly. Double-ended piston configurations have an advantage in this area in that the double-ended piston configuration naturally lends itself to improved reaction of the piston side loads.

SUMMARY OF THE INVENTION

The present invention provides an improved barrel engine with an integral air compressor. The engine is fundamentally a single-ended barrel engine that utilizes a double-ended design wherein one end of the engine is used for combustion, while the other end is used to compress air and act as a supercharger. The two ends are preferably interconnected such that compressed air from the compression end is fed to the intake system for the combustion end, although it is possible to use the compression end for other purposes such as gas compression. In one embodiment, the internal combustion barrel engine includes an output shaft with a longitudinal central axis that is rotatable about the central axis. A first combustion cylinder and a first compression cylinder are spaced apart and disposed on a common cylinder axis that is generally parallel to the central axis. The cylinders each have a inner end and an outer end, with the inner ends being closer to each other. An intake system is operable to introduce a combustible mixture into the combustion cylinder. A combustion piston is moveable within the first combustion cylinder and operable to compress the mixture in the combustion cylinder. A compression piston is moveable within the first compression cylinder. A track is supported on the output shaft and extends generally radially therefrom, such that a portion of the track is disposed between the inner ends of the first combustion cylinder and the first compression cylinder. The track has a longitudinally undulating surface and is rotatable with the output shaft such that as the track and output shaft rotate, the portion of the surface most directly between the inner ends of the cylinders undulates toward and away from the inner ends of the cylinders. A connecting rod has one end connected to the combustion piston and another end connected to the compression piston. A mid-portion of the connecting rod is in mechanical communication with the surface of the track such that as the track rotates the connecting rod urges the combustion piston outwardly within the first combustion cylinder to compress the mixture and then allows the combustion piston to move inwardly as the mixture expands. The compression piston moves with the connecting rod such that as the combustion piston moves outwardly, the compression piston moves inwardly and as the combustion piston moves inwardly, the compression piston moves outwardly. A valve assembly is provided to provide ambient air to the compression cylinder and to vent compressed air from the compression cylinder. The valve assembly comprises a generally flat valve plate having a generally flat inner surface facing the compression piston and an opposed generally flat outer surface. The valve plate further has an intake passage and an exhaust passage defined therethrough in fluid communication with the compression cylinder. An intake flapper valve is disposed on the inner surface of the valve plate and has a first position wherein the intake flapper valve is adjacent the inner surface of the valve plate and covers the intake passage. The intake flapper valve has a second position wherein a portion of the intake flapper valve flexes away from the inner surface so as to uncover the intake passage. An exhaust flapper valve is disposed on the outer surface of the valve plate and has a first position wherein the exhaust flapper valve is adjacent the outer surface of the valve plate and covers the exhaust passage. The exhaust flapper valve also has a second position wherein a portion of the exhaust flapper valve flexes away from the outer surface so as to uncover the exhaust passage. The compression piston and the first of the compression cylinders cooperate to compress a gas.

In further embodiments, a compression plenum is provided in fluid communication with the exhaust passage, such that compressed air from the compression cylinder flows into the compression plenum. The compression plenum is also in fluid communication with the intake system such that the intake system is operable to introduce a compressed combustible mixture into the combustion cylinder. A wastegate may be provided in fluid communication with a compression plenum and be selectively operable to vent the compressed air from the compression plenum. In other embodiments, the valve plate may include second and/or third or more intake and/or exhaust passages defined therethrough so as to increase the flow of gas into and out of the compression cylinder. When additional passages are provided, the same intake and exhaust flapper valves may be operable to cover and uncover these additional passages. In yet another embodiment, first and second compression and combustion cylinders are provided, along with first and second combustion and compression pistons, and first and second connecting rods. In this multi-cylinder embodiment, a compression plenum may be provided in fluid communication with the exhaust passages from each of the first and second compression cylinders. This compression plenum may then, in turn, be in fluid communication with the intake system for the combustion cylinders. Again, a wastegate may be provided for venting the compression plenum.

DESCRIPTION OF THE PREFERRED EMBODIMENTS

Various inventions related to internal combustion engines are disclosed in copending application Ser. Nos. 09/150,315 and 10/021,192, both of which are incorporated herein, in their entirety, by reference. The basic design of barrel engines may be best understood by reference to these disclosures. The present disclosure discusses only portions of a barrel engine design. Those of skill in the art will understand how these portions interact with the remainder of a functional engine.

The present invention provides for a method of creating boost air for the combustion process of a single-ended style of barrel engine in order to improve its overall power density. This is done by extending the piston assembly such that an air compressor piston-head is included opposite of the power piston-head giving an appearance similar to conventional barrel engine double-ended pistons. A schematic of the configuration is illustrated in FIG. 1.

Figure 1:
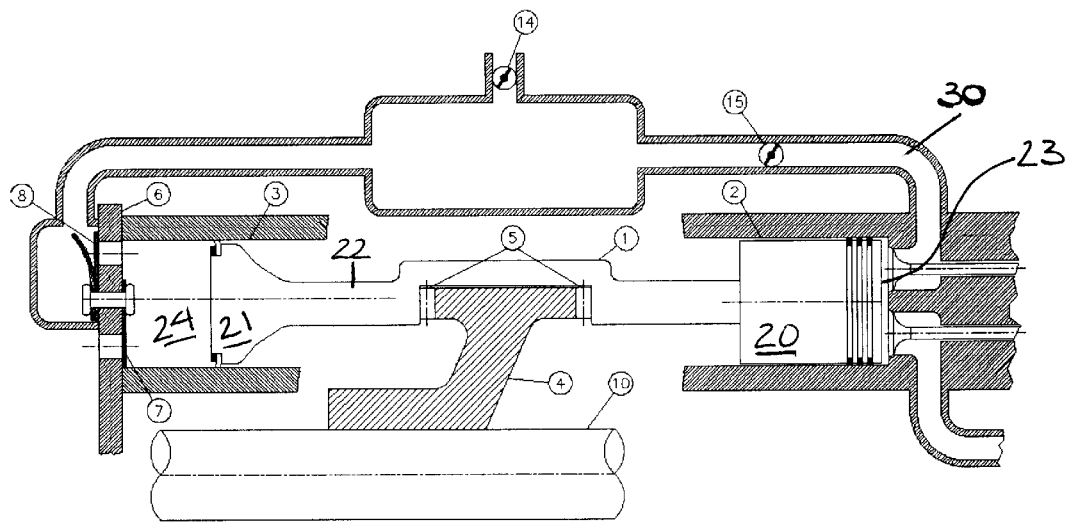
FIG. 1 is a schematic overview of an integral air compressor design for a barrel engine according to the present invention.

Referring to FIG. 1, a reciprocating piston assembly 1 is assembled within two co-axial cylinder bores, a power cylinder 2 and an air compression cylinder 3. The piston assembly includes a combustion piston 20 in the power cylinder 2 and an air compression piston 21 in the air compression cylinder 3. The pistons are interconnected by a connecting rod 22 with the pistons connected to opposite ends of the connecting rod 22. The pistons 20 and 21 and the connecting rod 22 may be formed as a single piece, or may be formed of multiple pieces. The piston assembly 1 is connected to a rotating track or cam 4 via rollers 5. Specifically, a midportion of the connecting rod 22 is connected to the track or cam 4 via the rollers 5. The track or cam 4 is connected to an output shaft 10 such that the track or cam 4 and output shaft 10 rotate together about the axis of the output shaft. The track or cam 4 has undulating upper and/or lower surfaces such that as the track or cam 4 rotates, the upper and/or lower surfaces move toward and away from the cylinders 2 and 3. As will be clear to those of skill in the art, the portion of the track between the cylinders 2 and 3 will undulate toward one of the cylinders as it undulates away from the other. As the track rotates, the pistons 20 and 21 are urged upwardly and downwardly in their cylinders 2 and 3, respectively. Consequently, combustion in the power cylinder 2 results in the track being urged to rotate.

As shown, the end of the power cylinder 2 is closed off by a head with traditional poppet style valves for supplying an intake air or an intake mixture to a combustion chamber 23 defined in the combustion cylinder 2 between the piston 20 and the head. The "intake system" may include one or more intake valves for controlling intake flow as well as one or more fuel injectors. In whatever configuration, the intake system is operable to introduce a combustible mixture to the combustion chamber, whether the combustible mixture is premixed prior to introduction to the chamber 23, or whether the mixture is created within the chamber. One or more traditional poppet style exhaust valves are also provided for exhausting combustion products from the combustion chamber 23. Other types of valves may be provided for controlling the flow of intake and exhaust to and from the combustion chamber 23, including, but not limited to, two-stroke style ports and rotary valves.

The combustion end of the engine may be used for two stroke or four stroke spark ignition, diesel or HCCI combustion strategies. Additoinally, the engine may consist of multiple combustion and compression cylinders. In one preferred embodiment, the combustion end provides a four stroke spark ignition combustion strategy, with increased power density and efficiency due to the supercharging effect of the compression features of the engine. At the other "end" of the engine, a compression chamber 24 is defined within the compression cylinder 3 between the end of the piston and a valve plate 6 which acts as a "head" for the compression chamber 24. As will be clear to those of skill in the art, as the track or cam 4 undulates and the pistons 21 and 22 move upwardly and downwardly in their respective cylinders, the chambers 23 and 24 expand and contract.

Figure 2:
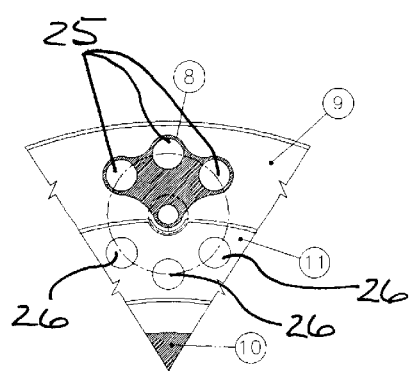
FIG. 2 is an end view of a compression cylinder showing the valve design.
Figure 3:
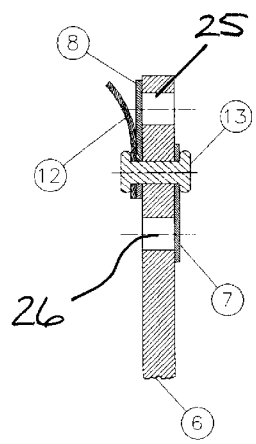
FIG. 3 is a cross sectional view of one embodiment of a reed/flapper valve assembly for use with the present invention.

The valve-plate 6 has reed/flapper valves for intake 7 and exhaust 8 of air or gas for the air compression cylinder 3. FIG. 2 illustrates an end view as seen from the "left" side of FIG. 1, exterior to the valve plate. As shown, the flapper valve 8 covers three exhaust passages 25 through the valve plate 6, which communicates with the compression chamber 24. The flapper valve 8 is preferably biased to a position wherein it covers and seals the passages 25. As will be clear to those of skill in the art, the exhaust flapper valve 8 is on the "outside" of the valve plate 6 so that the exhaust flapper valve 8 rests against the surface opposite the compression piston 21. FIG. 3 shows a cross section of the reed valve assembly 6, with the exhaust reed valve shown at 8 and the intake reed valve shown at 7. As shown, the intake flapper valve 7 covers three intake passages 26 (best shown in FIG. 2) through the valve plate 6. Again, the intake flapper valve 7 is biased to a position where it covers and seals the intake passages 26. The intake flapper valves are positioned on the "inside" of the valve plate 6 so that they are facing the compression piston and may be considered to be "inside" the compression chamber 24. The intake flapper valve 7 and the exhaust flapper valve 8 each act as one way flow valves, with the intake flapper valve allowing one way flow into the chamber 24 and the exhaust flapper valve 8 allowing one way flow out of the chamber 24. As shown, the valve plate is preferably a flat or substantially flat plate, which minimizes the volume of the compression chamber and simplifies production of the valve assembly. However, the valve plate may alternatively be domed, slanted, or otherwise shaped for some applications. Also, while the flapper valves are preferably parallel to the valve plate in their closed positions, they may also be slanted or positioned differently than shown.

As will be clear to those of skill in the art, the portion of the engine illustrated in FIG. 1 preferably is replicated concentrically about the output shaft 10 such that multiple power and compression cylinders are provided. Referring to FIGS. 1 and 2, a circular outer plenum 9, concentric with the output shaft 10, preferably connects the output of boosted air from all air compression chambers as regulated by exhaust reed valves 8. A similar concentric plenum 11 for ambient intake air is preferably provided inboard of the exhaust plenum (shown in FIG. 2). Air is ducted to this intake plenum from the engine air intake and filtration system.

Referring to FIGS. 1–3, as the reciprocating piston assembly 1 moves to enlarge the volume of the air in compression chamber 24, the reduced pressure within the chamber acts to open the intake reed valve 7 and air is received from the intake air plenum 11. That is, as the volume in the chamber 24 is expanded, a vacuum is formed and the relative pressure outside the engine (typically ambient pressure) acts to press against the intake flapper valve 7 until the bias of the flapper valve which retains it a closed position, is overcome and it flexes away from the passages 26. At this point air can flow through the passages 26 into the compression chamber 24. The bias of the exhaust reed valve 8 together with the relatively high boost air pressure in the exhaust plenum keeps the exhaust passages 25 sealed off during this process. As the piston assembly 1 moves to reduce the volume in the compression chamber 24, the increased pressure within the chamber allows the intake reed valve 7 to return to its closed position. When the pressure within the cylinder 3 increases to a point sufficiently above the pressure in the boost air plenum 9, the bias of the exhaust reed valve is overcome and it is urged open so the compressed air in the chamber is expelled to the plenum 9. A valve "backer" 12 may be included to provide structural support to the exhaust valve 8 during the opening period. As shown in FIG. 3, the exhaust backer 12, intake and exhaust reed valves 7 and 8, and valve plate preferably are all assembled via a single fastener 13, such as a rivet or bolt and nut.

The compressed or boost air is ducted from the exhaust plenum 9 of the air compression cylinders to the intake plenum 30 of the power cylinders. Alternatively, compressed air from individual compression chambers may be brought into individual combustion chambers, rather than the shared plenum. The same may be true for the intake to the compression chambers. As shown schematically in FIG. 1, the boost air pressure is preferably controlled by a wastegate mechanism 14 operable to the atmosphere to vent. A throttle 15 is preferably provided downstream of the wastegate 14. Another throttle may be included prior to the compressor inlet (not shown) depending upon the control strategy desired. A throttle prior to the compressor inlet, or controlling the flow of air to the intake plenum 11, could effectively turn off the compression stage of the engine or throttle it back. This allows the compression to effectively be turned on and off. Alternatively, the waste gate may be used. As yet another good alternative, a disabling feature may be used for disabling the compressor feature. An example is an opening device that presses either the intake or exhaust flapper valve open and holds it in this position so that the piston 21 is not effective at compressing air. This disabling device, commonly called a valve unloader, may consist of rods or fingers which hold the flapper valves open or closed or may be of the sliding leaf type used in MeritorWabco® compressors. Common practice in reciprocating compressors such as the one in this engine is to unload the suction or intake valve of the compressor, although it may also be beneficial to unload the exhaust valve instead of the intake or in combination with the intake to further minimize unloaded pumping losses.

The present invention provides numerous benefits over a single ended barrel engine design. Boost air is available to the combustion process in a more compact package than by more traditional means such as add-on turbochargers or superchargers. Because the compressor is an integral part of the design of the engine, the cost is potentially reduced as well. Boost air is created through the use of proven technology; involving reciprocating pistons and reed valves as opposed to precision high-speed turbine machinery. A small amount of piston inertial force is counteracted by the compression of the boost air. This results in some reduction of contact force on the piston rollers. The availability of boost air increases the flexibility of the barrel engine to include both 2-stroke and 4-stroke engine cycles. Without boost, a barrel engine has little ability to provide a fresh air charge to the cylinder during the intake process. This is particularly important in 2-stroke cycles where the pressure differential between bore and manifold (or crankcase) is limited. Typically, unboosted 2-stroke engines are crankcase scavenged for this reason. Crankcase scavenging is not practical for barrel engine configurations. This invention provides a relatively simple way to add boost to the barrel engine and add viability as a 2-stroke machine. Boost air can be used in both 2-stroke and 4-stroke cycles to enhance power density. This feature can be utilized to achieve higher power ratings, or to reduce bore and stroke. Reducing bore and stroke for a barrel engine can be very beneficial in reducing piston speeds and resulting accelerations, and also in reducing reciprocating mass. Both of these topics are important due to the internal stresses placed on the reciprocating components and the cam roller interface when high inertial forces are present. The present method of creating boost is unique to a single ended barrel engine construction. Because the power cylinders are located only on one end of the engine, the ability exists to utilize the "bottom" end for air compression. Further, this arrangement maintains the ability to employ variable compression ratio mechanisms that are simpler and less complicated than might be used in double-ended barrel engines or on more traditional slider-crank mechanisms. The use of the "bottom" of the single-ended piston as an air compressor combines the purposes of a lower crosshead and compression piston. In the same way as a "double-ended" swash piston, this invention provides an integral method of reacting piston side load and producing useable work in the form of boost air. The availability of boost air makes it possible to achieve more power at higher altitudes than otherwise possible. This is particularly important with aerial vehicles where high service ceilings are desired.

As discussed above, an engine according to the present invention may be constructed with multiple cylinders arranged around the power output shaft with the power cylinders all located at one end of the engine. As an alternative, alternating cylinders may be flipped end-to-end such that the power cylinders alternate end-to-end. Other arrangements may also be possible, such as two cylinders one direction and then two cylinders the other direction, or any other arrangement of cylinders. As would be clear to those skilled in the art, by varying the arrangement, the vibration and/or power characteristics may be altered. Also, although the combustion and compression cylinders are illustrated as being similar in diameter, they may be of slightly or substantially different diameter. For example, a compression cylinder significantly larger than the combustion cylinder may be desirable for high boost applications. The inverse may be beneficial in other applications.

As would be clear to those skilled in the art, the invention as herein described may be altered in various ways without departing from the scope or teaching of the present invention. It is the following claims, including all equivalents, which define the scope of the present invention.

I claim:

1. An internal combustion barrel engine comprising:

an output shaft having a longitudinal central axis and being rotatable about the central axis;

a first combustion cylinder and a first compression cylinder spaced apart and disposed on a common cylinder axis that is generally parallel to the central axis, the cylinders each having an inner end and a outer end with the inner ends being closer to each other;

an intake system operable to introduce a combustible mixture into the combustion cylinder;

a combustion piston movable within the first combustion cylinder and operable to compress the mixture in the combustion cylinder;

a compression piston movable within the first compression cylinder;

a track supported on the output shaft and extending generally radially therefrom such that a portion of track is disposed between the inner ends of the first combustion cylinder and the first compression cylinder, the track having a longitudinally undulating surface, the track being rotatable with the output shaft such that as the track and output shaft rotate the portion of the surface most directly between the inner ends of the cylinders undulates toward and away from the inner ends of the cylinders;

a connecting rod having a first end connected to the combustion piston, a second end connected to the compression piston, and a midportion therebetween, the midportion being in mechanical communication with the surface of the track such that as the track rotates, the connecting rod urges the combustion piston outwardly within the first combustion cylinder to compress the mixture and then allows the combustion piston to move inwardly within the first combustion cylinder as the mixture expands, the compression piston moving with the connecting rod such that as the combustion piston moves outwardly, the compression piston moves inwardly and as the combustion piston moves inwardly the compression piston moves outwardly; and a valve assembly for providing ambient air to the compression cylinder and venting compressed air from the compression cylinder to the intake system, the valve assembly comprising:

a valve body having an inner surface and an outer surface, the body further having an intake passage and an exhaust passage defined therethrough in fluid communication with the compression cylinder;

a intake flapper valve disposed on the inner surface of the valve body and having a first position wherein the intake flapper valve is adjacent the inner surface of the valve body and covers the intake passage, the intake flapper valve having a second position wherein a portion of the intake flapper valve flexes away from inner surface so as to uncover the intake passage; and an exhaust flapper valve disposed on the outer surface of the valve body and having a first position wherein the exhaust flapper valve is adjacent the outer surface of the valve body and covers the exhaust passage, the exhaust flapper valve having a second position wherein a portion of the exhaust flapper valve flexes away from the outer surface so as to uncover the exhaust passage.

2. An internal combustion barrel engine comprising:

an output shaft having a longitudinal central axis and being rotatable about the central axis;

a first combustion cylinder and a first compression cylinder spaced apart and disposed on a common cylinder axis that is generally parallel to the central axis, the cylinders each having an inner end and a outer end with the inner ends being closer to each other;

an intake system operable to introduce a combustible mixture into the combustion cylinder;

a combustion piston movable within the first combustion cylinder and operable to compress the mixture in the combustion cylinder;

a compression piston movable within the first compression cylinder;

a track supported on the output shaft and extending generally radially therefrom such that a portion of track is disposed between the inner ends of the first combustion cylinder and the first compression cylinder, the track having a longitudinally undulating surface, the track being rotatable with the output shaft such that as the track and output shaft rotate the portion of the surface most directly between the inner ends of the cylinders undulates toward and away from the inner ends of the cylinders;

a connecting rod having a first end connected to the combustion piston, a second end connected to the compression piston, and a midportion therebetween, the midportion being in mechanical communication with the surface of the track such that as the track rotates, the connecting rod urges the combustion piston outwardly within the first combustion cylinder to compress the mixture and then allows the combustion piston to move inwardly within the first combustion cylinder as the mixture expands, the compression piston moving with the connecting rod such that as the combustion piston moves outwardly, the compression piston moves inwardly and as the combustion piston moves inwardly the compression piston moves outwardly; and a valve assembly for providing ambient air to the compression cylinder and venting compressed air from the compression cylinder, the valve assembly comprising:

a generally flat valve plate having a generally flat inner surface facing the compression piston and an opposed generally flat outer surface, the valve plate further having an in take passage and an exhaust passage defined therethrough in fluid communication with the compression cylinder;

a intake flapper valve disposed on the inner surface of the valve plate and having a first position wherein the intake flapper valve is adjacent the inner surface of the valve plate and covers the intake passage, the intake flapper valve having a second position wherein a portion of the intake flapper valve flexes away from inner surface so as to uncover the intake passage; and an exhaust flapper valve disposed on the outer surface of the valve plate and having a first position wherein the exhaust flapper valve is adjacent the outer surface of the valve plate and covers the exhaust passage, the exhaust flapper valve having a second position wherein a portion of the exhaust flapper valve flexes away from the outer surface so as to uncover the exhaust passage;

wherein the compression piston and the first compression cylinder cooperating to compress a gas.

3. The engine of claim 2, wherein the intake system includes a fuel injector in the combustion cylinder.

4. The engine of claim 2, wherein the combustion piston, the compression piston, and the connecting rod are formed as a single piece.

5. The engine of claim 2, further comprising a compression plenum in fluid communication with the exhaust passage such that the compressed air from the compression cylinder flows into the compression plenum, the compression plenum being in fluid communication with the intake system such that the intake system is operable to introduce a compressed combustible mixture into the combustion cylinder.

6. The engine of claim 5, further comprising a wastegate in fluid communication with the compression plenum and selectively operable to vent compressed air from the compression plenum.

7. The engine of claim 2, wherein the valve plate further includes a second intake passage defined therethrough in fluid communication with the compression cylinder.

8. The engine of claim 7, wherein the intake flapper valve in the first position further covers the second intake passage and in the second position further uncovers the second intake passage.

9. The engine of claim 2, wherein the valve plate further includes a second exhaust passage defined therethrough in fluid communication with the compression cylinder.

10. The engine of claim 9, wherein the exhaust flapper valve in the first position further covers the second exhaust passage and in the second position further uncovers the second exhaust passage.

11. An internal combustion barrel engine comprising:

an output shaft having a longitudinal central axis and being rotatable about the central axis;

a first combustion cylinder and a first compression cylinder spaced apart and disposed on a first common cylinder axis that is generally parallel to the central axis, the first combustion and first compression cylinders each having an inner end and a outer end with the inner ends being closer to each other;

a second combustion cylinder and a second compression cylinder spaced apart and disposed on a second common cylinder axis that is generally parallel to the central axis and to the first common cylinder axis, the second combustion and second compression cylinders each having an inner end and an outer end with the inner ends being closer to each other;

an intake system operable to introduce a combustible mixture into the combustion cylinders;

a first combustion piston movable within the first combustion cylinder and a second combustion piston movable within the second combustion cylinder, the combustion pistons being operable to compress the mixture in their respective combustion cylinder;

a first compression piston movable within the first compression cylinder and a second compression piston movable within the second compression cylinder;

a track supported on the output shaft and extending generally radially therefrom such that a portion of track is disposed between the inner ends of the first combustion cylinder and the first compression cylinder and another portion of the track is disposed between the inner ends of the second combustion cylinder and the second compression cylinder, the track having a longitudinally undulating surface, the track being rotatable with the output shaft such that as the track and output shaft rotate the portions of the surface most directly between the inner ends of the first and second cylinders undulates toward and away from the inner ends of the first and second cylinders;

a first connecting rod and a second connecting rod, the first connecting rod having a first end connected to the first combustion piston, a second end connected to the first compression piston, and a midportion therebetween, the second connecting rod having a first end connected to the second combustion piston, a second end connected to the second compression piston, and a midportion therebetween, the midportions of the first and second connecting rods being in mechanical communication with the surface of the track such that as the track rotates, the connecting rods cause the combustion and compression pistons to reciprocate within the cylinders;

a first valve assembly for providing ambient air to the first compression cylinder and venting compressed air from the first compression cylinder, the valve assembly comprising:

a generally flat first valve plate having a generally flat inner surface facing the first compression piston and an opposed generally flat outer surface, the first valve plate further having an intake passage and an exhaust passage defined therethrough in fluid communication with the first compression cylinder;

a first intake flapper valve disposed on the inner surface of the first valve plate and having a closed position wherein the first intake flapper valve is adjacent the inner surface of the first valve plate and covers the intake passage, the first intake flapper valve having an open position wherein a portion of the first intake flapper valve flexes away from inner surface of the first valve plate so as to uncover the intake passage; and a first exhaust flapper valve disposed on the outer surface of the first valve plate and having an closed position wherein the first exhaust flapper valve is adjacent the outer surface of the first valve plate and covers the exhaust passage, the first exhaust flapper valve having an open position wherein a portion of the first exhaust flapper valve flexes away from the outer surface of the first valve plate so as to uncover the exhaust passage;

a second valve assembly for providing ambient air to the second compression cylinder and venting compressed air from the second compression cylinder, the valve assembly comprising:

a generally flat second valve plate having a generally flat inner surface facing the second compression piston and an opposed generally flat outer surface, the second valve plate further having an intake passage and an exhaust passage defined therethrough in fluid communicating with the second compression cylinder;

a second intake flapper valve disposed on the inner surface of the second valve plate and having a closed position wherein the second intake flapper valve is adjacent the inner surface of the second valve plate and covers the intake passage, the second intake flapper valve having an open position wherein a portion of the second intake flapper valve flexes away from inner surface of the second valve plate so as to uncover the intake passage; and a second exhaust flapper valve disposed on the outer surface of the second valve plate and having an closed position wherein the second exhaust flapper valve is adjacent the outer surface of the second valve plate and covers the exhaust passage, the second exhaust flapper valve having an open position wherein a portion of the second exhaust flapper valve flexes away from the outer surface of the second valve plate so as to uncover the exhaust passage;

wherein the compression pistons and the compression cylinders cooperating to compress a gas.

12. The engine of claim 11 wherein the intake system includes a fuel injector in the combustion cylinder.

13. The engine of claim 11, wherein the first combustion piston, the first compression piston, and the first connecting rod are formed as a single piece; and the second combustion piston, the second compression piston, and the second connecting rod are formed as a single piece.

14. The engine of claim 11, further comprising a compression plenum in fluid communication with the exhaust passage from the first compression cylinder and the exhaust passage from the second compression cylinder such that the compressed air from the first and second compression cylinder flows into the compression plenum, the compression plenum being in fluid communication with the intake system such that the intake system is operable to introduce a compressed combustible mixture into the combustion cylinders.

15. The engine of claim 14, further comprising a wastegate in fluid communication with the compression plenum and selectively operable to vent compressed air from the compression plenum.

16. The engine of claim 11, wherein the first and second valve plates each further include a second intake passage and a second exhaust passage defined therethrough in fluid communication with the respective compression cylinders.

17. The engine of claim 16, wherein the first intake flapper valve in the first position further covers the second intake passage in the first valve plate and in the second position further uncovers the second intake passage in the first valve plate;

the first exhaust flapper valve in the first position further covers the second exhaust passage in the first valve plate and in the second position further uncovers the second exhaust passage in the first valve plate;

the second intake flapper valve in the first position further covers the second intake passage in the second valve plate and in the second position further uncovers the second intake passage in the second valve plate; and the second exhaust flapper valve in the first position further covers the second exhaust passage in the second valve plate and in the second position further uncovers the second exhaust passage in the second valve plate.

* * * * *